Figure 1:
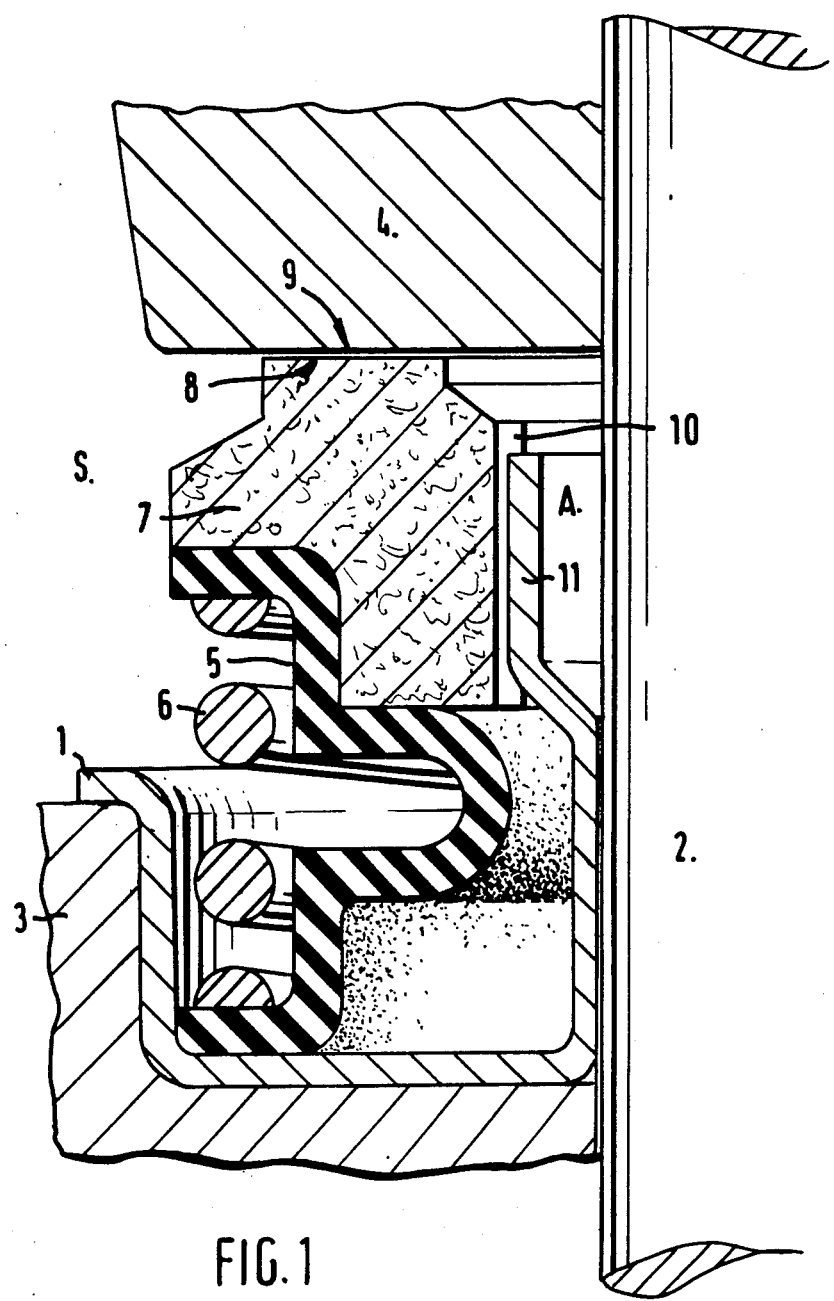

United States Patent [19]

Johnston

[11] Patent Number: 4,799,693
[45] Date of Patent: Jan. 24, 1989

[54] FACE SEALS WITH LIQUID PULSATION PUMPING FEATURE

[75] Inventor: David E. Johnston, Newcastle-upon-Tyne, United Kingdom

[73] Assignee: George Angus & Company Limited, Newcastle-upon-Tyne, England

[21] Appl. No.: 47,018
[22] PCT Filed: Aug. 18, 1986
[86] PCT No.: PCT/GB86/00491
§ 371 Date: Apr. 30, 1987
§ 102(e) Date: Apr. 30, 1987
[87] PCT Pub. No.: WO87/01170
PCT Pub. Date: Feb. 26, 1987

[30] Foreign Application Priority Data

Aug. 20, 1985 [GB] United Kingdom ............... 8520860

[51] Int. Cl.⁴ .............................................. F16J 15/34
[52] U.S. Cl. ........................... 277/96.1; 277/93 SD; 277/168
[58] Field of Search ............. 277/81 R, 93 R, 93 SD, 277/96, 96.1, 168, 170

[56] References Cited

U.S. PATENT DOCUMENTS

| | | | |
|---|---|---|---|
| 3,499,653 | 3/1970 | Gardner | 277/96.1 X |
| 3,738,667 | 6/1973 | Symons | 277/96.1 |
| 4,407,512 | 10/1983 | Trytek | 277/96.1 |

FOREIGN PATENT DOCUMENTS

| | | |
|---|---|---|
| 1928675 | 2/1970 | Fed. Rep. of Germany . |
| 59-43266 | 10/1984 | Japan . |
| 1237943 | 7/1971 | United Kingdom . |

*Primary Examiner*—Robert S. Ward
*Attorney, Agent, or Firm*—William R. Hinds

[57] ABSTRACT

A face seal has a sealing ring (7) with a frusto-conical margin (12) diverging from the plane of the contact band (8), so as to define a sealing region (13) which enlarges toward the sealed side "S," and a peripheral shoulder (14) which has a non-constant axial clearance from the counter-face to produce liquid pulsation which slightly reciprocates the sealing ring to effect, by displacement pumping, positive action toward the sealed side.

3 Claims, 2 Drawing Sheets

FACE SEALS WITH LIQUID PULSATION PUMPING FEATURE

This invention relates to face seals, for preventing fluid leakage between relatively rotatable members, such as a shaft and its housing.

Face seals have a sealing ring mounted, on one sealed member, for a transverse radial face of the ring to bear axially against a transverse radial counter-face, of the other member, to prevent leakage of sealed fluid between the opposed faces.

Probably the widest use of face seals is in the water-circulating pumps of the cooling systems of automobile engines, the sealing ring being mounted in the pump body, such as in the housing of the pump shaft bearing, to bear against a counter-face of the impeller hub. The sealed space in which the water circulates is called the sealed side "S" and the other side of the seal, open to atmosphere or ambient pressure, is called the air side "A".

Face sealing rings are usually made of a hard material, such as carbon, ceramic material or a plastics equivalent material, so that corrosion is resisted and the sealing face conforms to the counter-face to maintain a plane circular sealing contact band. The existing practice is to make the face and counterface surfaces as plane as possible.

Leakage at face seals occurs from causes such as uneven wear or grit becoming trapped in the interface of the contact band, spoiling the maintenance of plane face contact.

The present invention introduces for face seals a positive action to promote return to the sealed space of fluid tending to leak across the contact band to the air side.

According to one aspect of the invention, in a face seal having a sealing ring with an axially-directed annular sealing face to bear, under axial spring load, by a circular sealing contact band against a circular counter-face of a sealed relatively rotatable member, a peripheral margin of the contact band is made of frusto-conical form, to diverge from the plane of the contact band so as to define an annular sealing region which enlarges in circumferential area radially towards the sealed side of the seal, and the sealing ring is provided at the sealed side with a peripheral shoulder which is designed to have non-constant axial clearance from the counter-face so that, on relative rotation, liquid pulsation is produced in the clearance to cause slight variation in the axial load of the sealing ring against the counter-face and consequent displacement pumping in the sealing region towards the sealed side.

The term "contact" is of course used to include nominal or effective contact, with an interposed fluid film, to maintain a seal between the contact band and its counter-face.

The non-constant axial clearance of the sealing ring shoulder can be achieved by any suitable variation of the axial dimension of the shoulder. For example, the shoulder may have a lobed or sinuous configuration or be slightly canted across the rotational axis.

Figure 3:
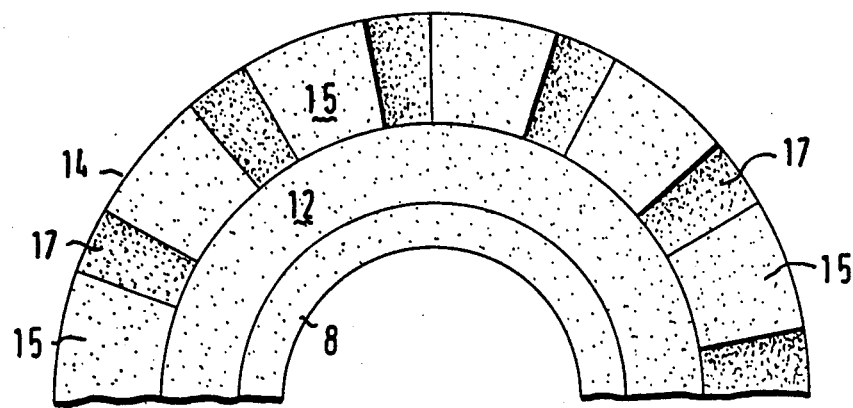
Figure 2:
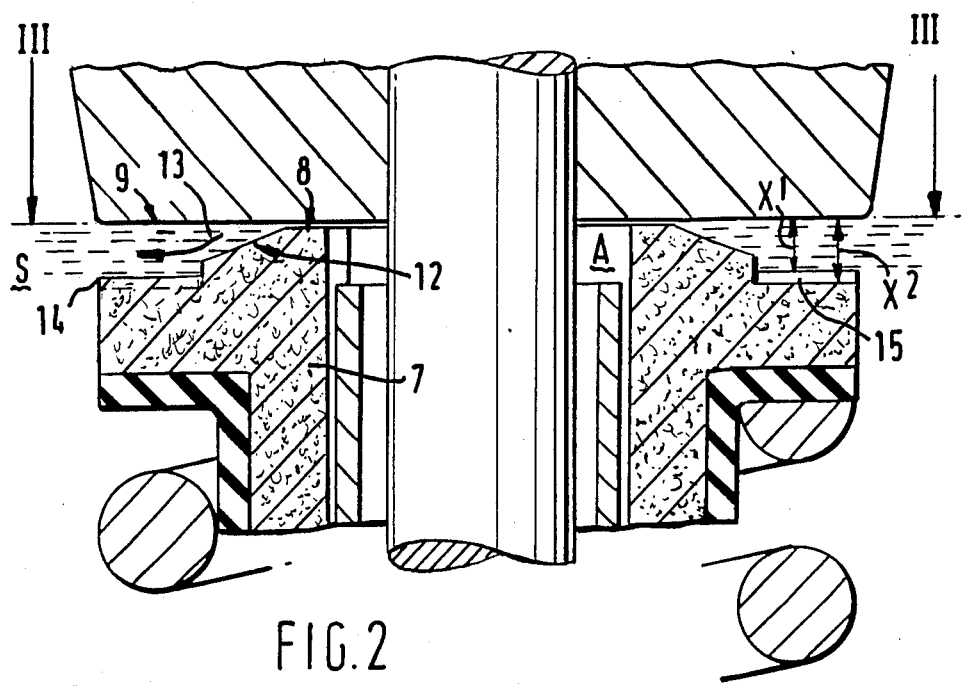

The invention is illustrated by way of example on the accompanying drawings, in which:

FIG. 1 is a somewhat diagrammatic half axial section, on a much enlarged scale, of a typical water pump face seal, FIG. 2 is a fragmentary axial section generally corresponding to part of FIG. 1 but showing one embodiment of a face seal in accordance with the invention, and FIG. 3 is a plan view, on the line III—III of FIG. 2, showing the face of the sealing ring.

The known kind of face seal shown by FIG. 1 comprises a casing cup 1 which is set, statically sealed in an annular recess around the pump shaft 2, in the bearing housing 3 of a water pump of which part of the impeller hub is shown as 4.

A circumferentially corrugated rubber sleeve 5 has one end clamped fluid-tight in the base of the cup 1 by a helical compression spring 6 which constantly loads axially towards the impeller hub 4 a face sealing ring 7 seated in the other end of the sleeve 5.

The sealing ring 7 bears axially under its spring-loading to seal by a circular contact band 8 against a plane machined counterface 9 of the impeller hub 4.

To permit the sealing ring 7 to move axially and to restrain the ring against becoming entrained in rotation of the impeller, the inner periphery of the ring 7 is longitudinally slotted at 10 and engaged by a spline key 11 formed in the axially extended inner wall of the cup 1.

The new features introduced by the present invention are illustrated by FIGS. 2 and 3.

On the face of the sealing ring 7, a peripheral margin 12 of the contact band 8 is made of frustoconical form so as to define an annular sealing region 13 which enlarges in circumferential area radially towards the sealed side "S". The scale of FIG. 2 is somewhat exaggerated for the purpose of illustration and the angle of conicity of the contact band margin 12 in practice will be small. The angle will be selected in accordance with size and operating conditions, including face seal diameter, axial loading, fluid pressure and rotational speed.

At the sealed side the sealing ring 7 has a peripheral shoulder 14 axially opposed to and spaced from the counter-face 9. Sector-shaped lobes 15 are formed on the shoulder 14 so that the shoulder has a non-constant axial clearance 16 from the counter-face. The axial dimension of the clearance 16 alternates between $X^1$ and $X^2$ respectively at the lobes 15 and intervening recesses 17.

As the counter-face 9 rotates, liquid is entrained in movement around the clearance 16 and the axial alternation of the clearance sets up pulsation of liquid in the clearance 16 with resultant variation of axial load of the sealing ring 7 against the counter-face 9. Consequently the sealing ring reciprocates, with a small amplitude less than would break the seal between the contact band 8 and counter-face 9, and displacement pumping of liquid is produced in the divergent sealing region 13 towards the sealed side "S".

The pumping displacement is slight, so as to maintain hydrodynamic lift at the interface between the contact band 8, with the margin 12, and the counter-face 9.

The radially outward displacement of liquid opposes leakage across the interface and tends to remove or prevent entry of dirt.

The shape of the shoulder 14 will be designed to achieve the pulsation required. In particular the shoulder 14 may be frusto-conical, in continuation of or stepped from the margin 12, and may be lobed, circumferentially sinuous or canted to produce the required non-constant axial clearance.

It will be seen that the features of the present invention are all embodied in the sealing ring and therefore a sealing ring itself is included in the scope of the invention. The production of face seals is carried out by seal manufacturers who buy the sealing rings from specialist carbon, ceramic or plastics suppliers. Such supply of sealing rings embodying the present invention is intended to be covered by the appended claims.

I claim:

1. A face seal having a sealing ring with an axially-directed annular sealing face to bear, under axial spring load, by a circular sealing contact band against a circular counter-face of a sealed relatively rotatable member, in which a peripheral margin of the contact band is made of frusto-conical form, to diverge from the plane of the contact-band so as to define an annular sealing region which enlarges in circumferential area radially towards the sealed side of the seal, and the sealing ring is provided at the sealed side with peripheral shoulder which is designed to have nonconstant axial clearance from the counter-face so that, on relative rotation, liquid pulsation is produced in the clearance to cause slight variation in the axial load of the sealing ring against the counter-face and consequent displacement pumping in the sealing region towards the sealed side.

2. A face seal as claimed in claim 1, in which the non-constant axial clearance is achieved by variation in the axial dimension of the shoulder.

3. A face seal as claimed in claim 2, in which the shoulder is of lobed or sinuous configuration.

* * * * *